(12) United States Patent
Wang

(10) Patent No.: US 11,888,588 B2
(45) Date of Patent: Jan. 30, 2024

(54) CLOCK DRIFT PROCESSING METHOD, NETWORK ELEMENT, AND STORAGE MEDIUM

(71) Applicant: TENCENT TECHNOLOGY (SHENZHEN) COMPANY LIMITED, Shenzhen (CN)

(72) Inventor: Tao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 164 days.

(21) Appl. No.: 17/485,381

(22) Filed: Sep. 25, 2021

(65) Prior Publication Data

US 2022/0014296 A1 Jan. 13, 2022

Related U.S. Application Data

(63) Continuation of application No. PCT/CN2020/091224, filed on May 20, 2020.

(30) Foreign Application Priority Data

Jun. 24, 2019 (CN) .................. 201910550491.X

(51) Int. Cl.
*H04J 3/06* (2006.01)
*H04W 56/00* (2009.01)

(52) U.S. Cl.
CPC .......... *H04J 3/0667* (2013.01); *H04J 3/0682* (2013.01); *H04W 56/001* (2013.01)

(58) Field of Classification Search
CPC ...... H04J 3/0638; H04J 3/0667; H04J 3/0682; H04W 56/001
See application file for complete search history.

(56) References Cited

U.S. PATENT DOCUMENTS 9,344,099 B2 * 5/2016 Buckler .................. G06F 5/06
2002/0039904 A1 4/2002 Anderson
(Continued)

FOREIGN PATENT DOCUMENTS

CN 101834712 A 9/2010
CN 102144363 A 8/2011
(Continued)

OTHER PUBLICATIONS

The State Intellectual Property Office of the People's Republic of China (SIPO) Office Action 1 for for 201910550491.X dated Mar. 2, 2021 6 Pages (including translation).
(Continued)

*Primary Examiner* — Alpus Hsu
(74) *Attorney, Agent, or Firm* — ANOVA LAW GROUP PLLC

(57) ABSTRACT

A method for processing clock drift implemented by a first network element includes: receiving a first notification message transmitted by a second network element, the first notification message including a first clock difference between a first clock domain and a second clock domain acquired by the second network element, transmission of the first notification message being triggered by a clock drift between the first clock domain and the second clock domain being greater than a drift amplitude value, which is a maximum value of a change amplitude of a clock difference between the first and second clock domain; determining first time sensitive communication assistance information (TSCAI) according to the first clock difference; and transmitting the first TSCAI to a radio access network (RAN) device, the first TSCAI being used by the RAN device to perform time control on a data stream in the first clock domain.

20 Claims, 11 Drawing Sheets

(56) References Cited

U.S. PATENT DOCUMENTS

| | | | |
|---|---|---|---|
| 2011/0161524 A1 | 6/2011 | Na et al. | |
| 2016/0112183 A1* | 4/2016 | Drop | G11C 29/028 375/371 |
| 2018/0242355 A1* | 8/2018 | Lou | H04W 72/121 |
| 2019/0042336 A1* | 2/2019 | McElrath | G06F 9/4887 |
| 2020/0127751 A1 | 4/2020 | Itagaki et al. | |
| 2020/0145921 A1* | 5/2020 | Zhang | H04W 52/0229 |

FOREIGN PATENT DOCUMENTS

| | | |
|---|---|---|
| CN | 109186590 A | 1/2019 |
| CN | 110213007 A | 9/2019 |
| WO | 2018221238 A1 | 12/2018 |

OTHER PUBLICATIONS

The World Intellectual Property Organization (WIPO) International Search Report for PCT/CN2020/091224 dated Aug. 5, 2020 6 Pages (including translation).

3GPP Technical Specification Group Services and System Aspects, "System Architecture for the 5G System; Stage 2 (Release 16)," 3GPP TS 23.501 Draft V16.1.0, May 31, 2019 (May 31, 2019). section 5.27. 367 pages.

\* cited by examiner

US 11,888,588 B2

CLOCK DRIFT PROCESSING METHOD, NETWORK ELEMENT, AND STORAGE MEDIUM

RELATED APPLICATIONS

This application is a continuation application of PCT Application No. PCT/CN2020/091224, entitled "CLOCK DRIFT PROCESSING METHOD, NETWORK FUNCTION NETWORK ELEMENTS, AND STORAGE MEDIUM" and filed on May 20, 2020, which in turn claims priority to Chinese Patent Application No. 201910550491.X, entitled "CLOCK DRIFT PROCESSING METHOD, NETWORK ELEMENT, AND STORAGE MEDIUM" and filed with the National Intellectual Property Administration, PRC on Jun. 24, 2019. The two applications are both incorporated herein by reference in entirety.

FIELD OF THE TECHNOLOGY

This application relates to the field of communication technologies, and in particular, to a method for processing clock drift, a network element, and a storage medium.

BACKGROUND OF THE DISCLOSURE

Time sensitive communication (TSC) of a time sensitive network (TSN) is introduced in Release 16 (R16) of the 5th generation (5G) mobile communication technology, so that 5G supports industrial automated manufacturing applications with precise time control.

To help with precise time control of a 5G (radio) access network ((R)AN), a session management function (SMF) element determines TSC assistance information (TSCAI) according to service information provided by an application function (AF) element. The TSCAI is actually precise time information of a local wireless network clock when a data stream arrives at a RAN device. As such, after the SMF element transmits the TSCAI to the RAN device, the RAN device may precisely control assignment of radio resources and scheduling of data according to the precise time information of the local wireless network clock provided in the TSCAI, to implement precise and efficient data transmission.

SUMMARY

Embodiments of this application provide a method for processing clock drift, to make it unnecessary to perform PDU session modification every time a clock drift occurs, thereby reducing signaling overheads. The embodiments of this application further provide a corresponding network element, a network device, a storage medium, and a computer program product.

One aspect of this application provides a method for processing clock drift. The method for processing clock drift is implemented by network elements. The method includes receiving, by a first network element, a first notification message transmitted by a second network element. The first notification message includes a first clock difference, the first clock difference is a clock difference between a first clock domain and a second clock domain acquired by the second network element in a first time period. Transmission of the first notification message by the second network element is triggered by a clock drift between the first clock domain and the second clock domain being greater than a drift amplitude value, the first clock domain is a clock domain of a data network (DN), the second clock domain is a clock domain of a wireless network, and the drift amplitude value is a maximum value of a change amplitude of a clock difference between the first clock domain and the second clock domain. The method further includes determining, by the first network element, first time sensitive communication assistance information (TSCAI) according to the first clock difference; and transmitting, by the first network element, the first TSCAI to a radio access network (RAN) device, the first TSCAI being used by the RAN device to perform time control on a data stream in the first clock domain.

Another aspect of this application provides a method for processing clock drift. The method includes transmitting, by a second network element, a first notification message to a first network element. The first notification message includes a first clock difference, the first clock difference is a clock difference between a first clock domain and a second clock domain acquired by the second network element in a first time period. Transmission of the first notification message by the second network element is triggered by a clock drift between the first clock domain and the second clock domain being greater than a drift amplitude value, the first clock domain is a clock domain of a data network (DN), the second clock domain is a clock domain of a wireless network, and the drift amplitude value is a maximum value of a change amplitude of a clock difference between the first clock domain and the second clock domain. The first clock difference is used for determining first time sensitive communication assistance information (TSCAI) by the first network element, and the first TSCAI is used by a radio access network (RAN) device to perform time control on a data stream in the first clock domain.

Another aspect of this application provides a first network element including a processor and a memory. The memory is configured to store computer-executable instructions, and the processor is configured to execute the computer-executable instructions to perform: receiving a first notification message transmitted by a second network element, the first notification message including a first clock difference; determining first time sensitive communication assistance information (TSCAI) according to the first clock difference; and transmitting the first TSCAI to a radio access network (RAN) device, the first TSCAI being used by the RAN device to perform time control on a data stream in the first clock domain. The first clock difference is a clock difference between a first clock domain and a second clock domain acquired by the second network element in a first time period. Transmission of the first notification message by the second network element is triggered by a clock drift between the first clock domain and the second clock domain being greater than a drift amplitude value, the first clock domain is a clock domain of a data network (DN), the second clock domain is a clock domain of a wireless network, and the drift amplitude value is a maximum value of a change amplitude of a clock difference between the first clock domain and the second clock domain.

Another aspect of this application provides a second network element including a processor and a memory. The memory is configured to store computer-executable instructions, and the processor is configured to execute the computer-executable instructions to perform: transmitting a first notification message to a first network element. The first notification message includes a first clock difference, the first clock difference is a clock difference between a first clock domain and a second clock domain acquired by the second network element in a first time period. Transmission of the first notification message by the second network element is triggered by a clock drift between the first clock domain and the second clock domain being greater than a drift amplitude value, the first clock domain is a clock domain of a data network (DN), the second clock domain is a clock domain of a wireless network, and the drift amplitude value is a maximum value of a change amplitude of a clock difference between the first clock domain and the second clock domain. The first clock difference is used for determining first time sensitive communication assistance information (TSCAI) by the first network element, and the first TSCAI is used by a radio access network (RAN) device to perform time control on a data stream in the first clock domain.

Another aspect of this application provides a non-transitory computer-readable storage medium, the computer-readable storage medium storing instructions, the instructions, when run on a computer, causing the computer to perform the method for processing clock drift described above.

In the solutions provided in the embodiments of this application, only when a clock drift exceeds a drift amplitude value, the SMF element is triggered to modify a PDU session, making it unnecessary to trigger the SMF element to modify a PDU session for each clock drift, thereby reducing signaling overheads.

DESCRIPTION OF EMBODIMENTS

Figure 1:
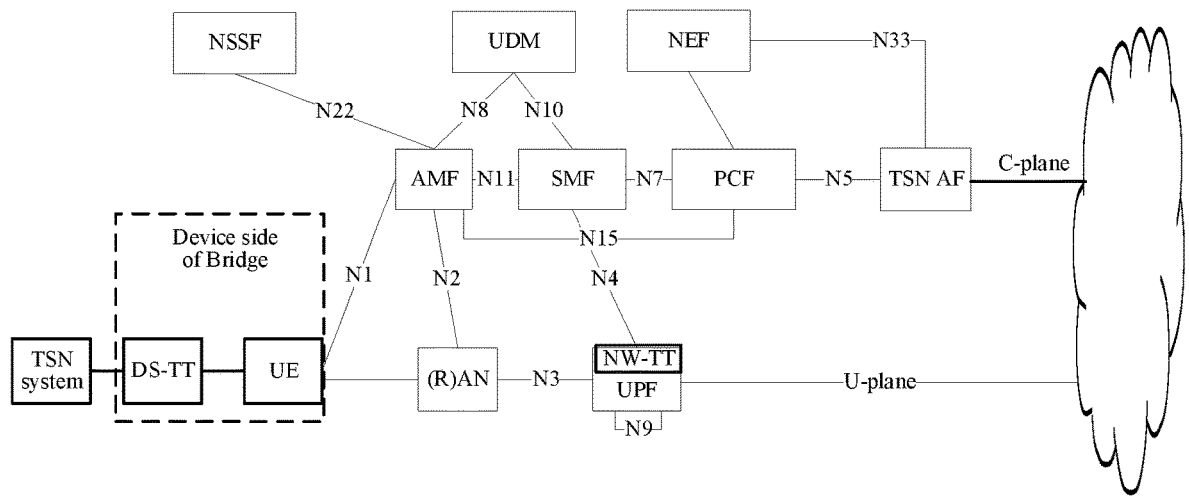
FIG. 1 is a schematic diagram of a network architecture of a 5G network according to an embodiment of this application.

The embodiments of this application are described in the following with reference to the accompanying drawings. It is obvious that the described embodiments are merely some rather than all of the embodiments of this application. A person of ordinary skill in the art may know that as the technology evolves and a new scenario emerges, the technical solutions provided in the embodiments of this application are also applicable to a similar technical problem.

In this specification, the claims, and the accompanying drawings of this application, the terms "first", "second", and the like are intended to distinguish similar objects but do not necessarily indicate a specific order or sequence. It is to be understood that the data used in such a way is interchangeable in proper cases, so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The embodiments of this application provide a method for processing clock drift, to make it unnecessary to adjust a state and a parameter by using some signaling every time a clock drift occurs, thereby reducing signaling overheads. The embodiments of this application further provide a corresponding network element, a network device, and a storage medium. Detailed descriptions are separately provided below. In the present application, a network element may refer to a hardware element, a software network, or a combination thereof, of a communication network. A network element may implement certain functions and methods as described in this application.

The data stream arriving at the RAN device has a burst arrival time, and the SMF element adds the burst arrival time to the TSCAI. The burst arrival time is calculated by the SMF element based on a clock domain (such as a 5G clock domain) where the wireless network is located. However, an arrival time T1 provided by the AF element is represented by using a time in a TSN domain where external data is located. Therefore, the SMF element needs to map the time in the TSN domain to the 5G clock domain, to calculate the burst arrival time. A calculation method based on mapping between different time domains may be RAN burst arrival time=T1 (UPF/NW-TT)+clock difference (an offset between a clock in the TSN domain where external data is located and a 5G clock (which is similar to a time zone difference))+delay of transmission from the UPF/NW-TT to the RAN.

The SMF element may obtain a value of T1 from the AF element, and the delay of transmission from the UPF/NW-TT to the RAN is usually configured by a network or measured by the UPF element or the like, and may be considered as a fixed value. However, the clock difference is measured by the UPF/NW-TT. Due to irresistible physical reasons, there is always a clock drift between two different clocks. Therefore, the clock difference may keep changing.

The clock drift is a difference between a maximum value and a minimum value of the clock difference in a specific time period. When the UPF element finds that the clock difference changes, the SMF element is notified. Then, the SMF element may initiate a packet data unit (PDU) session modification process, and transmit a new burst arrival time caused by a new clock difference to the RAN. Because the clock drift is very common, the UPF element frequently triggers the SMF element to initiate the PDU session modification process, generating a large quantity of signaling. As a result, signaling overheads are increased.

The method for processing clock drift provided in the embodiments of this application may be applied to a 5G network, and may also be applied to other networks that can support TSC data transmission. Description is made below by using the 5G network as an example.

First, 5G network structures applicable to this application are respectively described below with reference to accompanying drawings.

Figure 2:
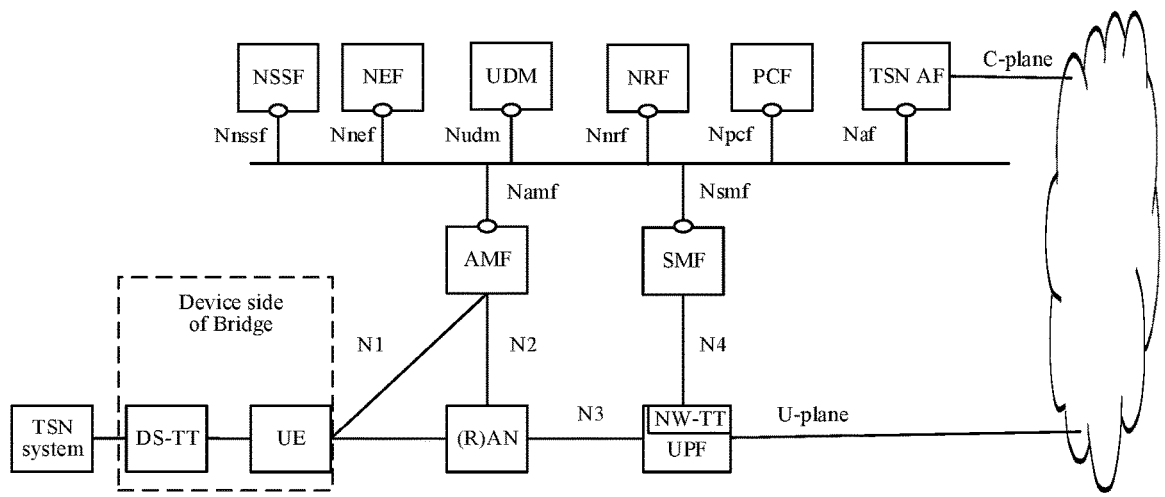
FIG. 2 is a schematic diagram of another network architecture of a 5G network according to an embodiment of this application.

FIG. 1 is a schematic diagram of a communication network architecture of a TSN in a 5G network according to this application. FIG. 2 is a schematic diagram of another communication network architecture that is of a TSN in a 5G network and that is represented by server interfaces. UEs, (R)ANs, and UPF elements in FIG. 1 and FIG. 2 are usually referred to as user plane network elements or entities.

In the TSN, both the UE and a device-side TSN translator (DS-TT) pertain to a device side of bridge, and the device side of bridge is connected to a TSN system. The UPF element includes a network-side TSN translator (NW-TT).

To implement the transparency for the TSN, and use a 5G system (5GS) as a bridge (that is, a 5GS bridge) of any other TSN, the 5GS provides an entrance port and an exit port for the TSN by using the DS-TT and the NW-TT. The DS-TT and the NW-TT optionally support the following functions:

a maintaining and forwarding function, to eliminate a jitter; and discovery and reporting of link-layer connectivity.

The UE may include: a handheld terminal, a notebook computer, a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, or other devices that can access a network. The UE and an access network device communicate with each other by using an air interface technology.

The RAN device is mainly responsible for functions such as radio resource management, quality of service (QoS) management, and data compression and encryption on an air interface side. The RAN device may include base stations in various forms, for example, a macro base station, a micro base station (also referred to as a small cell), a relay station, and an access point. In systems using different radio access technologies, names of devices having a function of a base station may be different. For example, in the 5GS, the device is referred to as a gNB.

Other elements in FIG. 1 and FIG. 2 are referred to as control plane network elements or entities, and are mainly configured to implement reliable and stable transmission of user plane traffic. An SMF element is mainly responsible for user plane element selection, user plane element redirection, Internet Protocol (IP) address assignment, establishment, modification, and release of carriers, release, establishment, or modification of QoS flows, and the like. An access and mobility management function (AMF) element is mainly responsible for signaling processing, for example, access control, mobility management, attachment and detachment, element selection, and other functions. A PCF element is mainly responsible for providing a unified policy framework to control network behaviors, and provide a policy rule for a control plane network function, and is also responsible for obtaining user subscription information related to policy decision. An AF element is mainly responsible for interacting with a 3rd generation partnership project (3GPP) core network to provide services, for example, affect a data route decision and a PCF, or provide some third-party services for a network side. A network slice selection function (NSSF) element is mainly configured to select a network slice. An NEF element is mainly responsible for secure interaction between a 3GPP network and a third-party application. The NEF element can securely expose capabilities and events of the network to the third-party application, to strengthen or improve quality of application services. The 3GPP network may also securely obtain related data from the third-party application, to enhance intelligent decision making of the network. In addition, the element supports to restore structured data from a unified database, or store the structured data in the unified database. A unified data management (UDM) element may be configured to perform data management.

In the elements shown in FIG. 1 and FIG. 2, to help the 5G RAN device to perform precise time control, the SMF element determines TSCAI according to service information provided by the AF element. The TSCAI is actually precise time information of a local wireless network clock when a data stream arrives at the RAN device. As such, after the SMF element transmits the TSCAI to the RAN device, the RAN device may precisely control assignment of radio resources and scheduling of data according to the precise time information of the local wireless network clock provided in the TSCAI, to implement precise and efficient data transmission.

The data stream arriving at the RAN device has a burst arrival time, and the SMF element adds the burst arrival time to the TSCAI. The burst arrival time is calculated by the SMF element based on a clock domain (such as a 5G clock domain) where the wireless network is located. However, an arrival time T1 provided by the AF element is represented by using a time in a TSN domain where external data is located. Therefore, the SMF element needs to map the time in the TSN domain to the 5G clock domain, to calculate the burst arrival time in the 5G clock domain.

A calculation method based on mapping between different time domains may be: downlink RAN burst arrival time=T1 (UPF/NW-TT)+clock difference (an offset between a clock in the TSN domain where external data is located and a 5G clock (which is similar to a time zone difference))+delay of transmission from the UPF/NW-TT to the RAN; and uplink RAN burst arrival time=T2 (UE/DS-TT)+clock difference (the offset between the clock in the TSN domain where external data is located and the 5G clock (which is similar to a time zone difference))+delay of transmission from the DS-TT to the UE.

The SMF element may obtain a value of T1 from the AF element, and the delay of transmission from the UPF/NW-TT to the RAN is usually configured by a network or measured by the UPF element or the like, and may be considered as a fixed value. The delay of transmission from the UPF/NW-TT to the RAN may be usually measured by the UE, and may also be considered as a fixed value. However, the clock difference is measured by the UPF/NW-TT. Due to irresistible physical reasons, there is always a clock drift between two different clocks. Therefore, the clock difference may keep changing.

Figure 3:
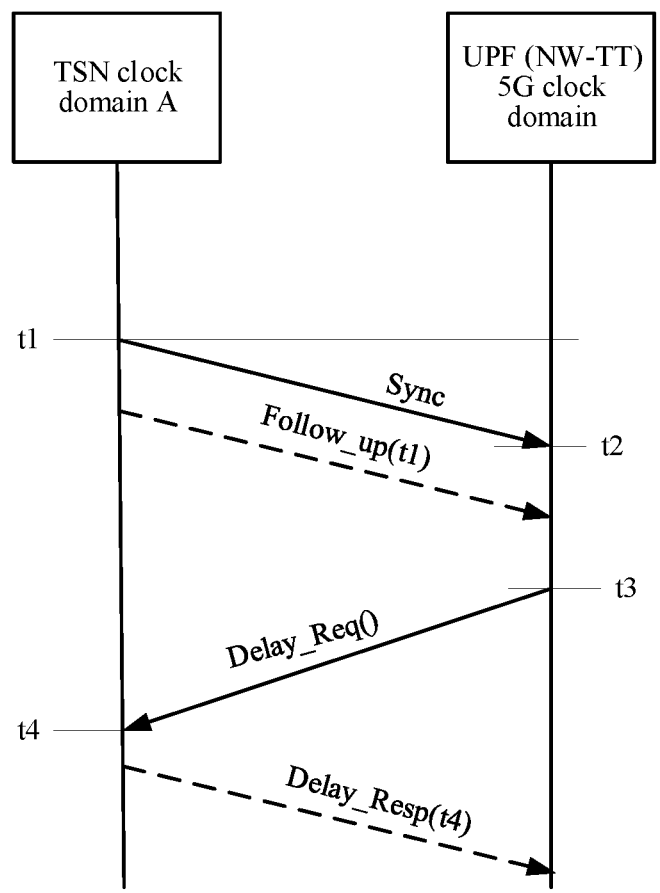
FIG. 3 is an exemplary diagram of a process of calculating a clock difference according to an embodiment of this application.

For a process of calculating a clock difference, a process for calculating a clock difference between a clock domain A of a DN and the 5G clock domain is used as an example. As shown in FIG. 3, the clock difference may be represented as Offset=(t2+t3−t1−t4)/2.

t1 is a time that is in the clock domain A and that is carried in a Sync message or a Follow_up message. t2 and t3 are times in the 5G clock domain. t2 is a time at which the Sync message is received, and t3 is a time at which a Delay_Req message is transmitted. t4 is a time at which Delay_Req( ) is received in the clock domain A. A clock drift is a difference between a maximum value and a minimum value of Offset in a specific time period.

In a method for calculating a clock drift, clock differences may be all positive, or may be positive or negative according to whether one clock goes faster or slower than the other.

For example, at 10:00:00 a.m., a reading in a clock domain 1 is 10:00:03 (hour, minute, second), and a reading in a clock domain 2 is 10:00:13, so that a clock difference between the two clock domains is 10 seconds. At 11:00:00 a.m., a reading in the clock domain 1 is 11:00:03, and a reading in the clock domain 2 is 10:59:51, so that a clock difference between the two clock domains is 12 seconds. In this case, a clock drift between the two clock domains in a time period from 10:00:00 to 11:00:00 is 12−10=2 seconds.

In another calculation method, at 10:00:00 a.m., a reading in a clock domain 1 is 10:00:03, and a reading in a clock domain 2 is 10:00:13, so that a clock difference between the two clock domains is 10 seconds. At 11:00:00 a.m., a reading in the clock domain 1 is 11:00:03, and a reading in the clock domain 2 is 10:59:51, so that a clock difference between the two clock domains is 12 seconds. At 10:00:00, the clock domain 2 is 10 seconds ahead of the clock domain 1, while at 11:00:00, the clock domain 2 is 12 seconds later than the clock domain 1. In this case, a clock drift is 22 seconds.

A specific method for calculating a clock drift is not limited in the embodiments of this application, and in a network, an algorithm selected to calculate a clock drift is set by an operator as required in the network.

After the UE initiates establishment of a PDU session, the UE communicates with the network-side SMF element and other DN elements by using the RAN device. Because the RAN device needs to provide resources for data stream transmission between the UE and the DN element, the RAN device performs resource scheduling and data control according to the TSCAI provided by the SMF element. If the TSCAI needs to be updated, the SMF element needs to initiate a PDU session modification process. However, as described above, the clock drift causes changes in the clock difference. Therefore, the SMF element is triggered to update the TSCAI. To avoid frequently initiating the PDU session modification process due to the clock drift, the embodiments of this application provide the following clock drift processing method.

Figure 4:
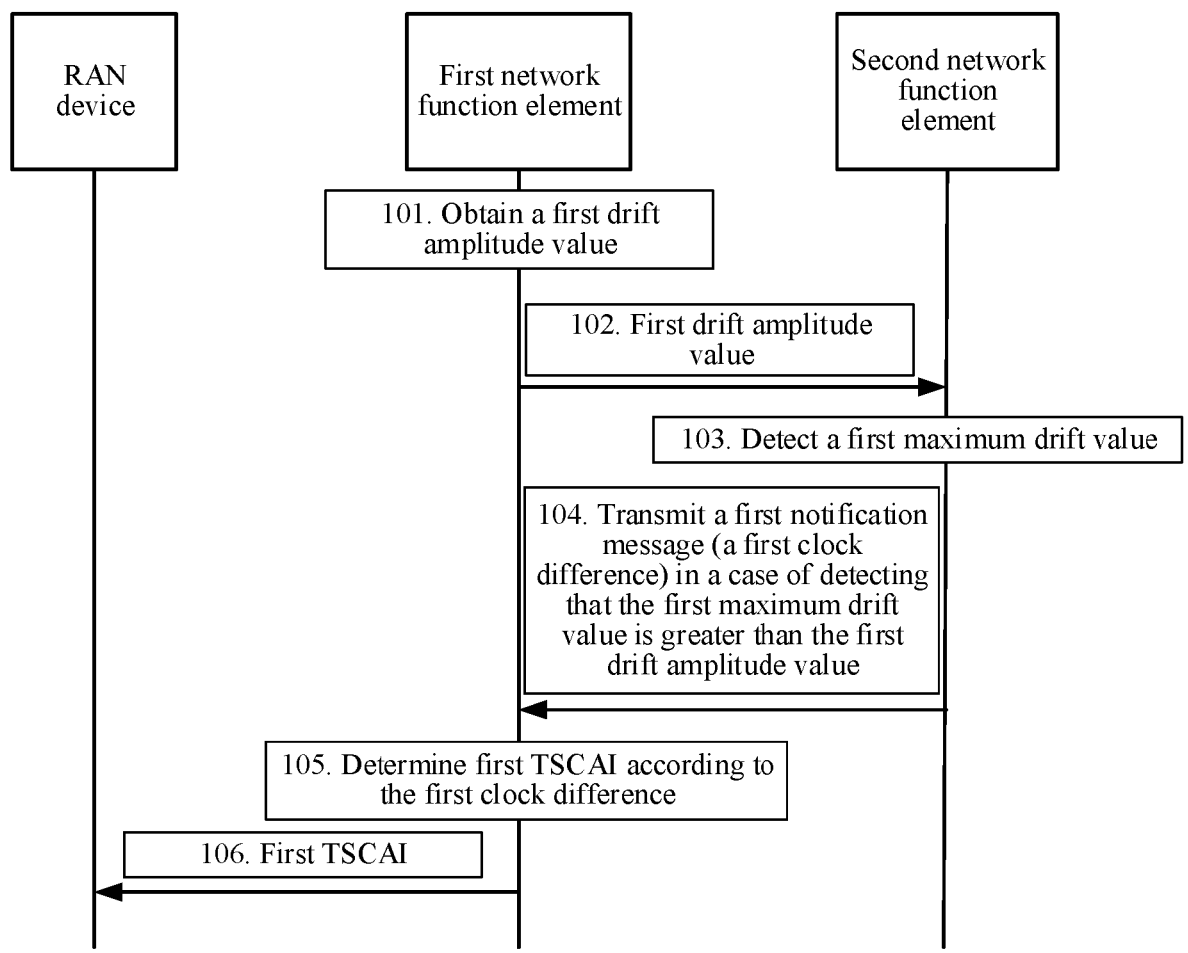
FIG. 4 is a schematic diagram of an embodiment of a method for processing clock drift according to the embodiments of this application.

FIG. 4 shows an embodiment of the method for processing clock drift according to the embodiments of this application. The method may include the following steps:

101. A first network element obtains a first drift amplitude value.

The first drift amplitude value is a maximum value of a change amplitude of a clock difference between a first clock domain and a second clock domain, the first clock domain being a clock domain of a DN, for example, a clock domain of a TSN network, and the second clock domain being a clock domain of a wireless network in which the first network element is located, for example, a 5G clock domain.

102. The first network element transmits the first drift amplitude value to a second network element.

103. The second network element detects a first maximum drift value after receiving the first drift amplitude value transmitted by the first network element.

The first maximum drift value is a difference between a maximum clock difference and a minimum clock difference that are between the first clock domain and the second clock domain in a first time period, the first time period being a time period from a moment at which the second network element receives the first drift amplitude value to a moment at which the first maximum drift value is greater than the first drift amplitude value.

104. The second network element transmits a first notification message to the first network element when detecting that the first maximum drift value is greater than the first drift amplitude value. Correspondingly, the first network element receives the first notification message transmitted by the second network element, the first notification message including a first clock difference.

The first clock difference is the last clock difference that is acquired by the second network element between the first clock domain and the second clock domain in the first time period, the last clock difference being a clock difference between the first clock domain and the second clock domain when the first maximum drift value is greater than the first drift amplitude value.

The first maximum drift value being greater than the first drift amplitude value is used for triggering the second network element to transmit the first notification message.

The second network element transmits the first clock difference that triggers transmission of the first notification message, that is, the last clock difference in the first time period, to the first network element.

105. The first network element determines first TSCAI according to the first clock difference.

In the embodiments of this application, one data stream corresponds to one piece of TSCAI. If the second network element reports a clock difference, the first network element needs to update TSCAI corresponding to the data stream according to the reported clock difference, and then transmit the updated TSCAI to the RAN device, so that the RAN device may precisely control the data stream according to the updated TSCAI.

106. The first network element transmits the first TSCAI to a RAN device, the first TSCAI being used by the RAN device to perform time control on a data stream in the first clock domain.

In the solutions provided in the embodiments of this application, only when a clock drift exceeds a drift amplitude value, the SMF element is triggered to modify a PDU session, making it unnecessary to trigger the SMF element to modify a PDU session for each clock drift, thereby reducing signaling overheads.

In some possible embodiments, the obtaining, by a first network element, a first drift amplitude value may include:
receiving, by the first network element, the first drift amplitude value transmitted by a PCF element, the first drift amplitude value being transmitted by an AF element to the PCF element or being transmitted by the AF element to the PCF element by using an NEF element.

In some possible embodiments, the obtaining, by a first network element, a first drift amplitude value may include:
receiving, by the first network element, the first drift amplitude value transmitted by a PCF element, the first drift amplitude value being determined by the PCF element according to a second drift amplitude value, the second drift amplitude value being transmitted by an AF element to the PCF element or being transmitted by the AF element to the PCF element by using an NEF element, and the second drift amplitude value being less than the first drift amplitude value.

In some possible embodiments, the obtaining, by a first network element, a first drift amplitude value may include:

determining, by the first network element, the first drift amplitude value according to configuration information of the first network element.

In some possible embodiments, the method for processing clock drift provided in the embodiments of this application may further include:

obtaining, by the first network element, a third drift amplitude value, the third drift amplitude value being a maximum value of a change amplitude of a clock difference between a third clock domain and the second clock domain, the third clock domain being a clock domain of a DN that the second network element accesses;

transmitting, by the first network element, a PDU session modification request to the RAN device;

determining, by the first network element, second TSCAI; and transmitting, by the first network element, the second TSCAI to the RAN device, the second TSCAI being used by the RAN device to perform time control on a data stream in the third clock domain.

In some possible embodiments, before the determining, by the first network element, second TSCAI, the method may further include:

transmitting, by the first network element, the third drift amplitude value to the second network element;

receiving, by the first network element, a second notification message transmitted by the second network element, the second notification message including a second clock difference, the second notification message being transmitted by the second network element when detecting that a second maximum drift value is greater than the third drift amplitude value, the second maximum drift value being a difference between a maximum clock difference and a minimum clock difference that are between the third clock domain and the second clock domain in a second time period, the second time period being a time period from a moment at which the second network element receives the third drift amplitude value to a moment at which the second maximum drift value is greater than the third drift amplitude value, the second clock difference being the last clock difference that is acquired by the second network element between the third clock domain and the second clock domain in the second time period, the last clock difference being a clock difference between the third clock domain and the second clock domain when the second maximum drift value is greater than the third drift amplitude value; and the determining, by the first network element, second TSCAI may include:

determining, by the first network element, the second TSCAI according to the second clock difference.

In some possible embodiments, the second network element receives the third drift amplitude value transmitted by the first network element, the third drift amplitude value being a maximum value of a change amplitude of a clock difference between the third clock domain and the second clock domain, the third clock domain being a clock domain of a DN that the second network element accesses; and the second network element transmits a second notification message to the first network element, the second notification message including the second clock difference, the second notification message being transmitted by the second network element when detecting that the second maximum drift value is greater than the third drift amplitude value, the second maximum drift value being a difference between a maximum clock difference and a minimum clock difference that are between the third clock domain and the second clock domain in a second time period, the second time period being a time period from a moment at which the second network element receives the third drift amplitude value to a moment at which the second maximum drift value is greater than the third drift amplitude value, the second clock difference being the last clock difference that is acquired by the second network element between the third clock domain and the second clock domain in the second time period, the last clock difference being a clock difference between the third clock domain and the second clock domain when the second maximum drift value is greater than the third drift amplitude value, the second clock difference being used for determining second TSCAI, and the second TSCAI being used by the RAN device to perform time control on a data stream in the third clock domain.

In another embodiment of the method for processing clock drift provided in the embodiments of this application, the method may include:

obtaining, by a PCF element, a first drift amplitude value, the first drift amplitude value being a maximum value of a change amplitude of a clock difference between a first clock domain and a second clock domain, the first clock domain being a clock domain of a DN, and the second clock domain being a clock domain of a wireless network in which a first network element is located; and transmitting, by the PCF element, the first drift amplitude value to the first network element, the first drift amplitude value being used by a second network element to transmit a first notification message to the first network element when detecting that a first maximum drift value is greater than the first drift amplitude value, the first maximum drift value being a difference between a maximum clock difference and a minimum clock difference that are between the first clock domain and the second clock domain in a first time period, the first time period being a time period from a moment at which the second network element receives the first drift amplitude value to a moment at which the first maximum drift value is greater than the first drift amplitude value, the first notification message including a first clock difference, the first clock difference being the last clock difference that is acquired by the second network element between the first clock domain and the second clock domain in the first time period, the last clock difference being a clock difference between the first clock domain and the second clock domain when the first maximum drift value is greater than the first drift amplitude value, the first clock difference being used for determining first TSCAI, and the first TSCAI being used by a RAN device to perform time control on a data stream in the first clock domain.

In some possible embodiments, the obtaining, by a PCF element, a first drift amplitude value may include:

receiving, by the PCF element, the first drift amplitude value transmitted by an AF element, or the first drift amplitude value transmitted by the AF element by using an NEF element.

In some possible embodiments, the obtaining, by a PCF element, a first drift amplitude value may include:

receiving, by the PCF element, a second drift amplitude value transmitted by an AF element, or a second drift amplitude value transmitted by the AF element by using an NEF element; and determining, by the PCF element, the first drift amplitude value according to the second drift amplitude value, the second drift amplitude value being less than the first drift amplitude value.

In some possible embodiments, the obtaining, by a PCF element, a first drift amplitude value may include:

determining, by the PCF element, the first drift amplitude value according to configuration information of the PCF element.

In the embodiments of this application, the first network element may be an SMF element, and the second network element may be a UPF element.

Three different solutions A, B, and C of step 101 in which the first network element obtains the first drift amplitude value are respectively described below by using an example in which the first network element is an SMF element, and the second network element is a UPF element. The following gives detailed descriptions respectively.

Figure 5A:
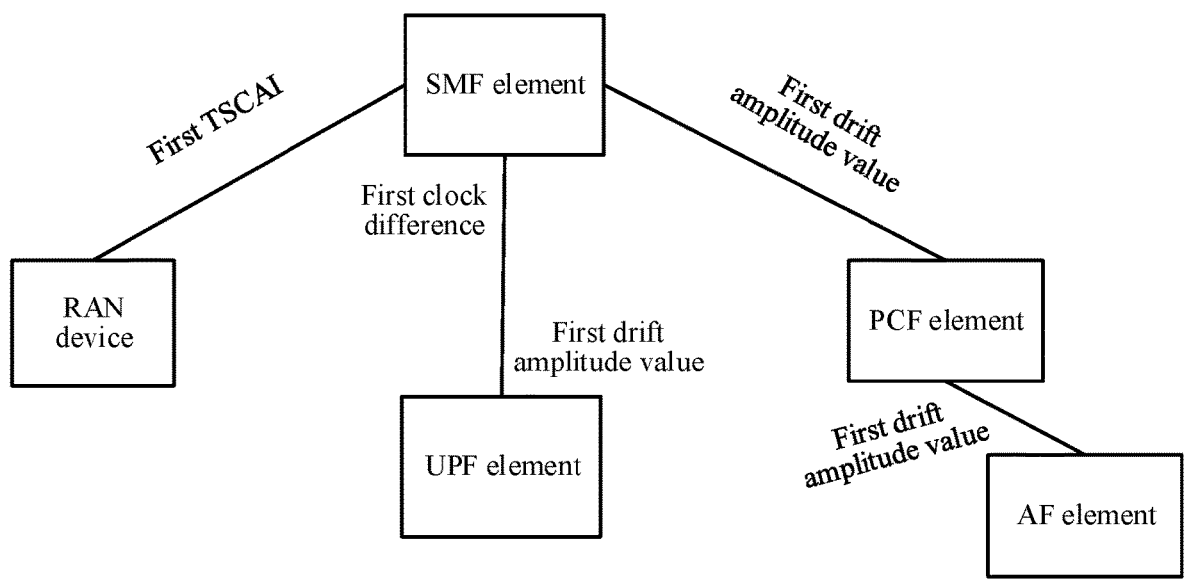
FIG. 5A is a schematic diagram of a network structure of clock drift processing according to an embodiment of this application.

Solution A: As shown in FIG. 5A, the AF element in the embodiments of this application transmits the first drift amplitude value to the PCF element. Alternatively, the AF element may transmit the first drift amplitude value to the PCF element by using the NEF element. The PCF element transmits the first drift amplitude value to the SMF element, and the SMF element then transmits the first drift amplitude value to the UPF element. When a first maximum drift value is greater than the first drift amplitude value, the UPF element transmits a first clock difference to the SMF element, and the SMF element determines first TSCAI according to the first clock difference. The SMF element then transmits the first TSCAI to the RAN device, so that the RAN device performs time control on a data stream in the first clock domain according to the first TSCAI.

Figure 5B:
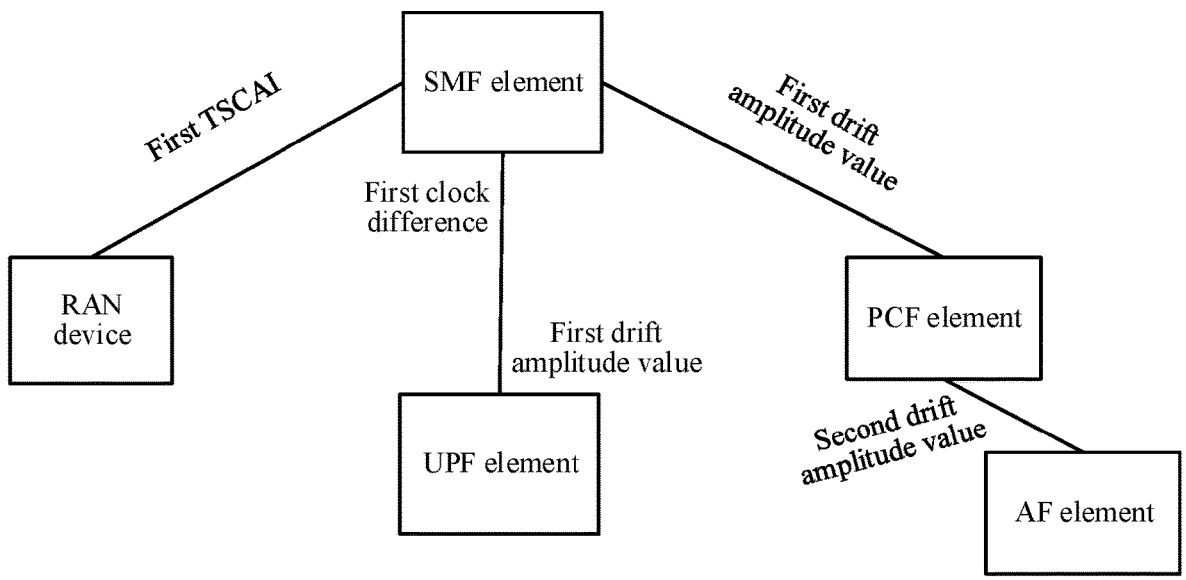
FIG. 5B is a schematic diagram of another network structure of clock drift processing according to an embodiment of this application.

Solution B: As shown in FIG. 5B, the AF element in the embodiments of this application transmits a second drift amplitude value to the PCF element. Alternatively, the AF element may transmit the second drift amplitude value to the PCF element by using the NEF element. Alternatively, the AF element may not provide any drift amplitude value. The PCF element determines the first drift amplitude value according to the second drift amplitude value. Alternatively, the PCF element determines the first drift amplitude value according to configuration information of the PCF element, and then transmits the first drift amplitude value to the SMF element. The second drift amplitude value is less than the first drift amplitude value. The SMF element then transmits the first drift amplitude value to the UPF element. When a first maximum drift value is greater than the first drift amplitude value, the UPF element transmits a first clock difference to the SMF element, and the SMF element determines first TSCAI according to the first clock difference. The SMF element then transmits the first TSCAI to the RAN device, so that the RAN device performs time control on a data stream in the first clock domain according to the first TSCAI.

Figure 5C:
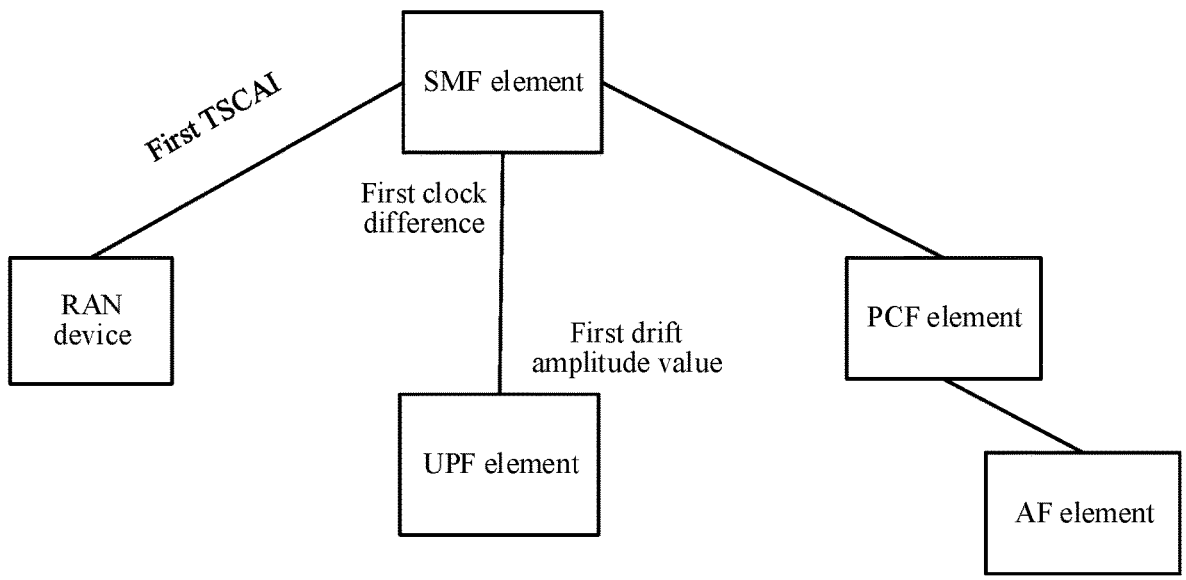
FIG. 5C is a schematic diagram of another network structure of clock drift processing according to an embodiment of this application.

Solution C: As shown in FIG. 5C, neither the AF element nor the PCF element in the embodiments of this application provides any drift amplitude value. As such, the SMF element determines the first drift amplitude value according to configuration information of the SMF element. The SMF element then transmits the first drift amplitude value to the UPF element. When a first maximum drift value is greater than the first drift amplitude value, the UPF element transmits a first clock difference to the SMF element, and the SMF element determines first TSCAI according to the first clock difference. The SMF element then transmits the first TSCAI to the RAN device, so that the RAN device performs time control on a data stream in the first clock domain according to the first TSCAI.

The method for processing clock drift is briefly described above. The method for processing clock drift provided in the embodiments of this application is described below with reference to a specific application environment.

Figure 6:
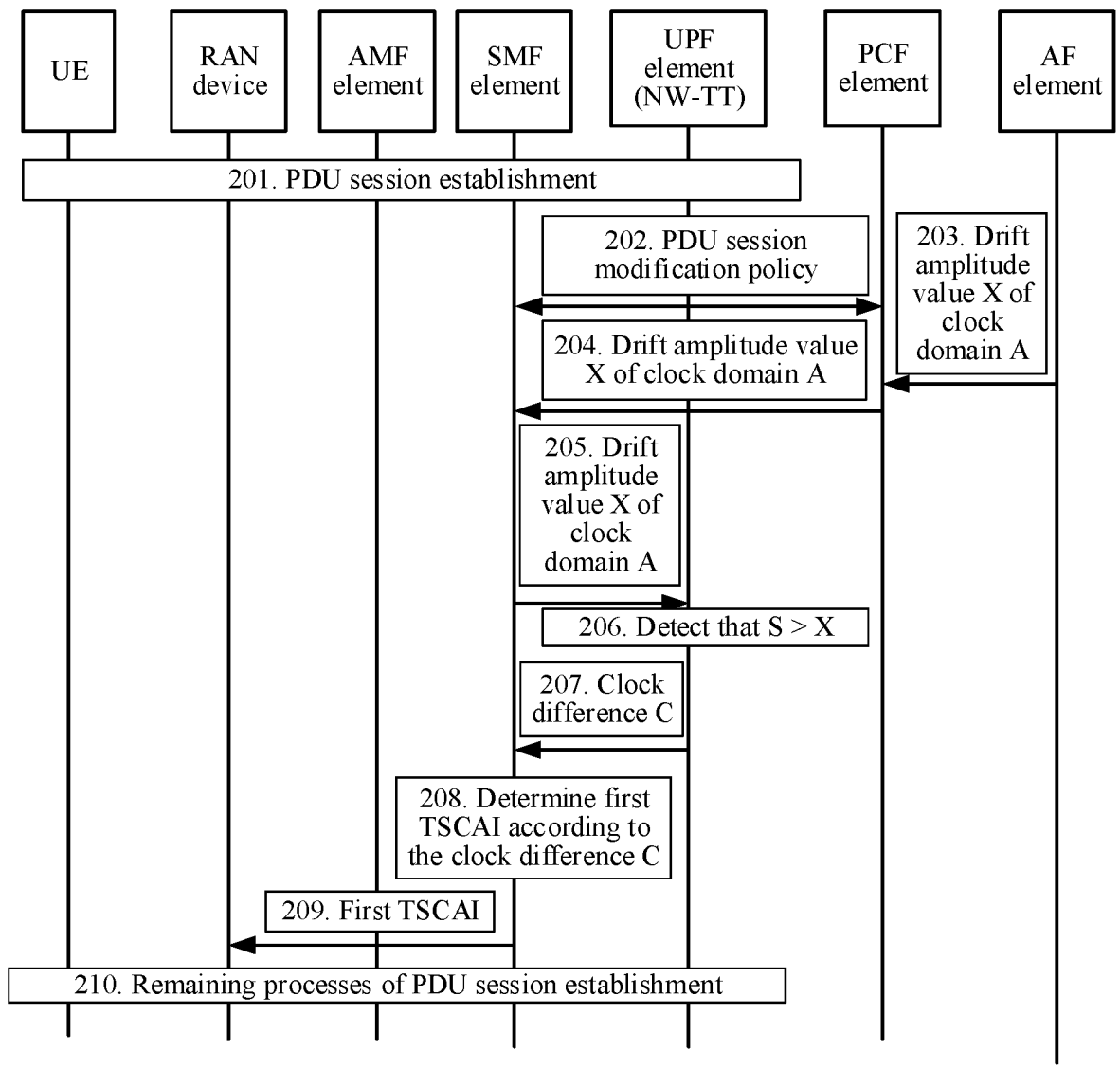
FIG. 6 is a schematic diagram of another embodiment of the method for processing clock drift according to the embodiments of this application.

FIG. 6 shows another embodiment of the method for processing clock drift according to the embodiments of this application. The method may include the following steps:

201. UE initiates a session establishment process, to establish a PDU session with a RAN device, an AMF element, an SMF element, and a UPF element.

202. The SMF element obtains a PDU session modification policy from a PCF element.

The PDU session modification policy may include initial TSCAI provided by the PCF element.

203. An AF element transmits a drift amplitude value X of a clock domain A to the PCF element.

The clock domain A is a clock domain of a DN.

204. The PCF element transmits the drift amplitude value X of the clock domain A to the SMF element.

205. The SMF element transmits the drift amplitude value X of the clock domain A to the UPF element.

The SMF element may transmit the drift amplitude value X to the UPF element by using a PDU session establishment request or a PDU session modification request.

206. The UPF element detects that a maximum drift value S>X.

The maximum drift value S may be the first maximum drift value described in the foregoing embodiments, and the meaning of the maximum drift value S may be understood with reference to the first maximum drift value in the foregoing embodiments. X may be the first drift amplitude value in the foregoing embodiments, and the meaning of X may be understood with reference to the first drift amplitude value in the foregoing embodiments.

The UPF element in step 206 may be the UPF element in step 201. Alternatively, the UPF element may not be the UPF element in step 201, but is a UPF element that can detect that the maximum drift value S>X. That is, provided that the UPF element is connected to the clock domain of the DN, that the maximum drift value S>X may be detected.

207. The UPF element reports a clock difference C to the SMF element.

The UPF element is in a clock domain of a wireless network. The clock domain generally refers to a clock domain of a 5G network, and the clock difference is a difference between the clock domain A and the clock domain of the 5G network.

The clock difference C is the last clock difference in a time period in which it is detected that S>X, that is, a clock difference between the clock domain A and the 5G clock domain when S>X.

When the UPF element and the SMF element pertain to the same PDU session, the UPF element may transmit the clock difference C to the SMF element by using an N4 session establishment response or an N4 session report. When the UPF element and the SMF element do not pertain to the same PDU session, the UPF element may transmit the clock difference C to the SMF element by using an N4 association response report.

208. The SMF element determines first TSCAI according to the clock difference C.

In step 202, the PCF element provides the initial TSCAI. When S>X, after the UPF element provides the clock difference C to the SMF element, the SMF element may modify the initial TSCAI according to the clock difference C, to obtain the first TSCAI. A process of modifying the initial TSCAI may be understood with reference to the following formula:

Downlink RAN burst arrival time=$T1$(UPF/NW-TT)+Offset+delay of transmission from the UPF/NW-TT to the RAN.

Uplink RAN burst arrival time=$T2$(UE/DS-TT)+clock difference (an offset between a clock in a TSN domain where external data is located and a 5G clock (which is similar to a time zone difference))+delay of transmission from the DS-TT to the UE.

$T1$(UPF/NW-TT), $T2$(UE/DS-TT), the delay of transmission from the DS-TT to the UE, and the delay of transmission from the UPF/NW-TT to the RAN may be determined from the initial TSCAI. The clock difference C in the scenario is Offset, and therefore, the clock difference C may be substituted into the foregoing formula, to obtain a new uplink or downlink RAN burst arrival time through calculation. As such, the first TSCAI is determined.

209. The SMF element transmits the first TSCAI to the RAN device.

210. The UE, the RAN device, the AMF element, the SMF element, and the UPF element complete the subsequent PDU session establishment process.

In the solutions provided in the embodiments of this application, only when a clock drift exceeds a drift amplitude value, the SMF element is triggered to modify a PDU session, making it unnecessary to trigger the SMF element to modify a PDU session for each clock drift, thereby reducing signaling overheads while performing precise time control on data streams in the clock domain of the DN.

Figure 7:
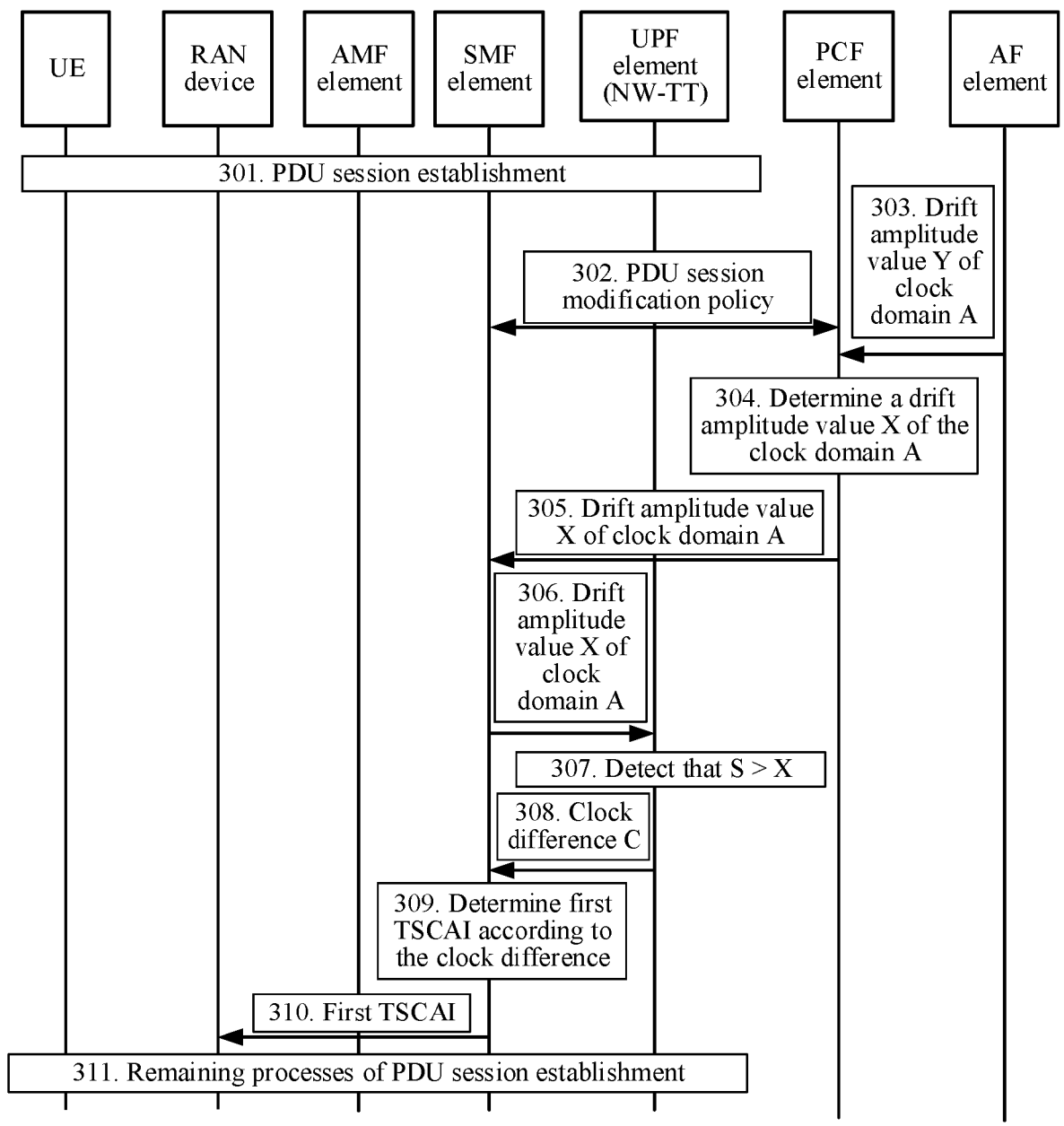
FIG. 7 is a schematic diagram of another embodiment of the method for processing clock drift according to the embodiments of this application.

FIG. 7 shows another embodiment of the method for processing clock drift according to the embodiments of this application. The method may include the following steps:

In step 301 to step 311, step 301 and step 302 are the same as step 201 and step 202, and step 305 to step 311 are the same as step 204 to step 210. Step 303 and step 304 in this embodiment are different from corresponding steps in the embodiment described in FIG. 6.

303. The AF element transmits a drift amplitude value Y of the clock domain A to the PCF element.

304. The PCF element determines a drift amplitude value X of the clock domain A, X<Y.

Other steps in this embodiment may be understood with reference to the description of the embodiment corresponding to FIG. 6.

In addition, in this embodiment of this application, neither the AF element nor the PCF element provides the drift amplitude value X for the SMF element, and the SMF element determines the drift amplitude value X according to configuration information of the SMF element.

A process of establishing a PDU session for the clock domain A is described above. If another clock domain B is added in this process, a solution in such a scenario may be understood with reference to FIG. 8.

Figure 8:
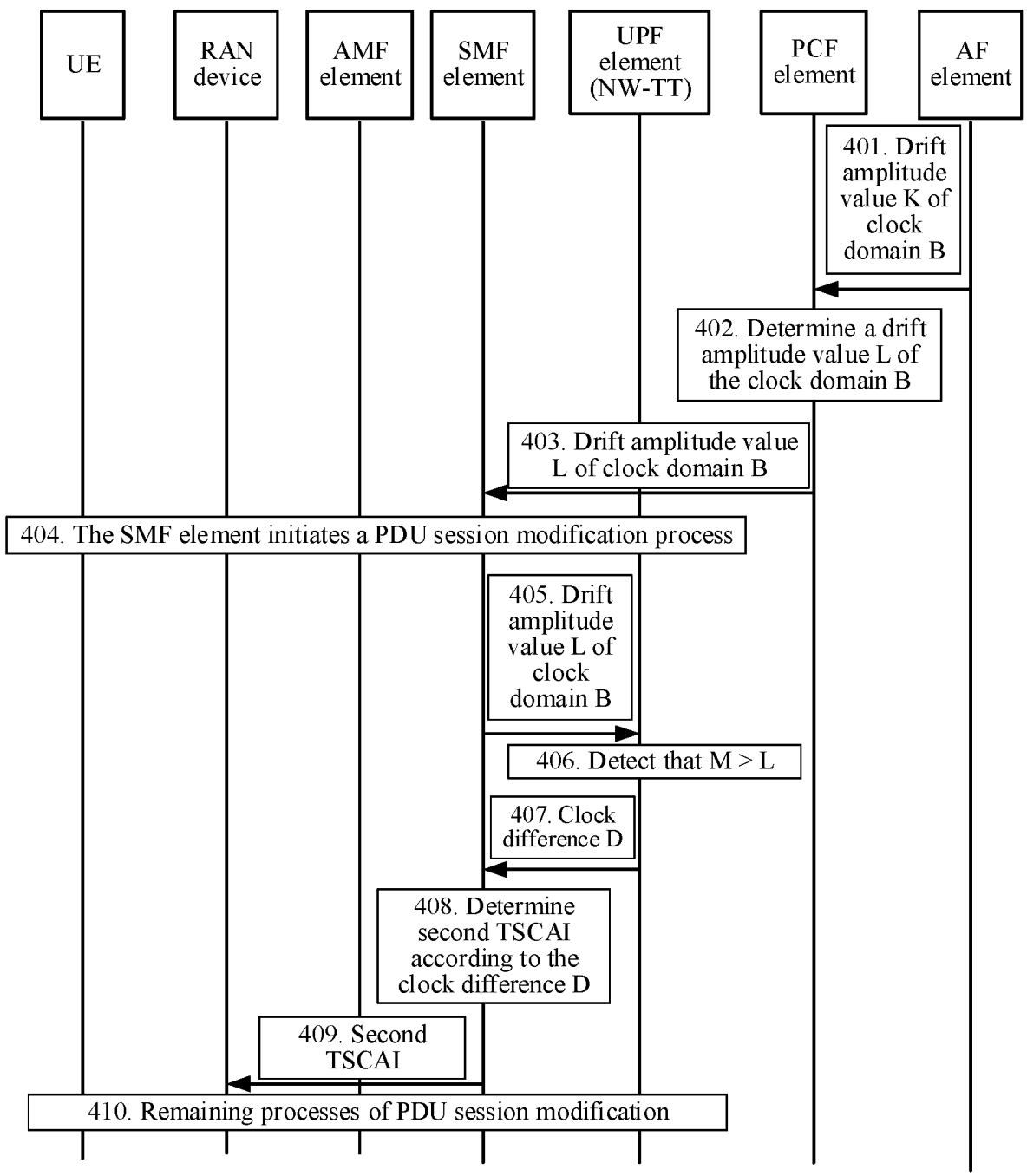
FIG. 8 is a schematic diagram of another embodiment of the method for processing clock drift according to the embodiments of this application.

FIG. 8 shows another embodiment of the method for processing clock drift according to the embodiments of this application. The method may include the following steps:

401. An AF element transmits a drift amplitude value K of a clock domain B to a PCF element.

402. The PCF element determines a drift amplitude value L of the clock domain B, L<K.

The drift amplitude value L may be understood with reference to the second drift amplitude value in the foregoing embodiments.

403. The PCF element transmits the drift amplitude value L of the clock domain B to an SMF element.

404. The SMF element initiates a PDU session modification process.

405. The SMF element transmits the drift amplitude value L of the clock domain B to a UPF element.

The drift amplitude value L may be transmitted by using an N4 session modification request.

406. The UPF element detects that a maximum drift value M>L.

The maximum drift value M may be understood with reference to the second maximum drift value in the foregoing embodiments.

407. The UPF element reports a clock difference D to the SMF element.

The clock difference D is the last clock difference in a time period in which it is detected that M>L, that is, a clock difference between the clock domain B and a 5G clock domain when M>L.

When the UPF element and the SMF element pertain to the same PDU session, the UPF element may transmit the clock difference D to the SMF element by using an N4 session establishment response or an N4 session report. When the UPF element and the SMF element do not pertain to the same PDU session, the UPF element may transmit the clock difference D to the SMF element by using an N4 association response report.

The clock difference D may be understood with reference to the second clock difference.

408. The SMF element determines second TSCAI according to the clock difference D.

A process of determining the second TSCAI may be understood with reference to the process of determining the first TSCAI in step 208. Details are not described herein again.

409. The SMF element transmits the second TSCAI to a RAN device.

410. UE, the RAN device, an AMF element, the SMF element, and the UPF element complete the subsequent PDU session modification process.

In this embodiment of this application, the UPF element triggers the PDU session modification process, to update TSCAI.

Figure 9:
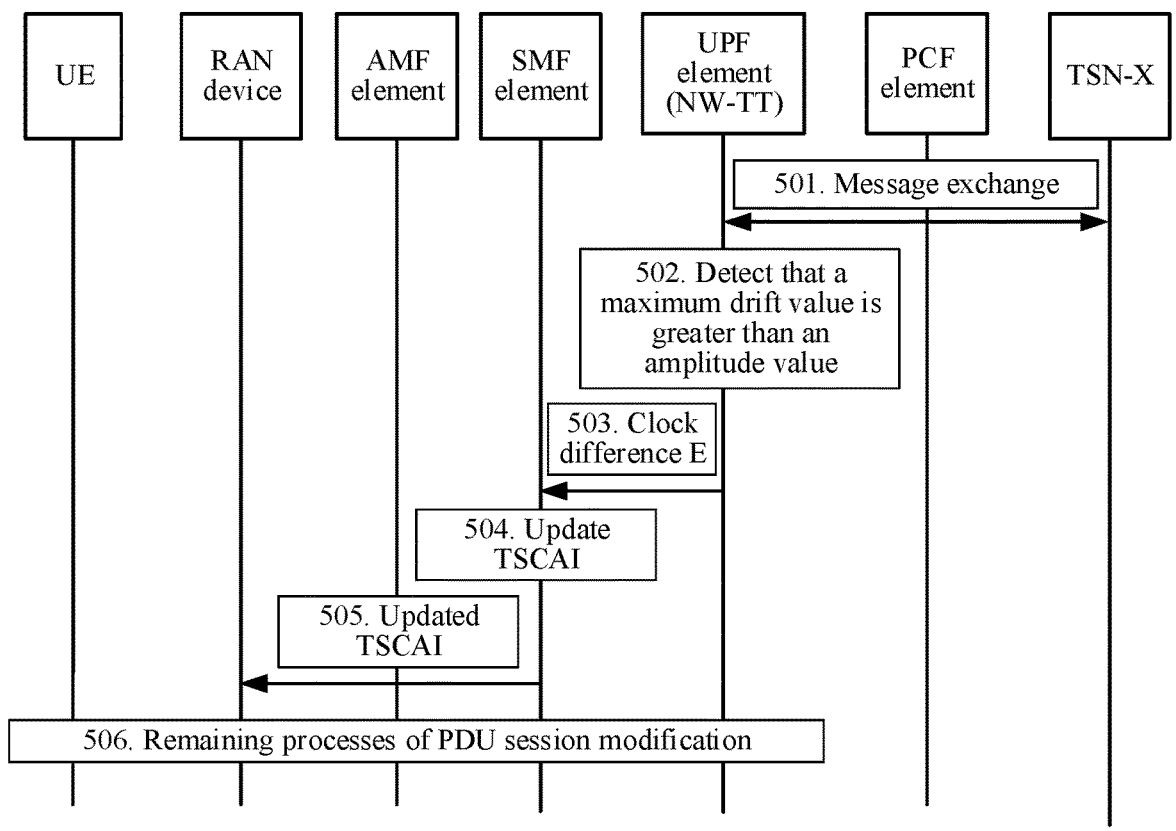
FIG. 9 is a schematic diagram of another embodiment of the method for processing clock drift according to the embodiments of this application.

FIG. 9 shows another embodiment of the method for processing clock drift according to the embodiments of this application. The method may include the following steps:

501. A UPF element performs message exchange with a TSN-X device.

The message exchange may be message exchange based on a Precision Time Protocol (PTP) or a general PTP (gPTP).

502. The UPF element detects that a maximum drift value in a time period is greater than a drift amplitude value transmitted by an SMF element.

503. The UPF element reports a clock difference E to the SMF element.

The clock difference E may be understood with reference to related meanings of the first clock difference, the second clock difference, the clock difference C, and the clock difference D in the foregoing embodiments. The clock difference E is reported to the SMF element by the UPF element by using an N4 session or N4 association.

504. The SMF element updates TSCAI of a data stream in a corresponding clock domain according to the clock difference E, and initiates a PDU session modification process.

The process of updating the TSCAI may be understood with reference to the description in step 208 in the foregoing embodiment.

For example, if the data stream is a data stream in a clock domain A, first TSCAI of the data stream in the clock domain A is updated.

505. The SMF element transmits the updated TSCAI to a RAN device.

506. UE, the RAN device, an AMF element, the SMF element, and the UPF element complete the subsequent PDU session modification process.

The plurality of embodiments above describes the method for processing clock drift provided in the embodiments of this application. The network element provided in the embodiments of this application is described below with reference to accompanying drawings.

Figure 10:
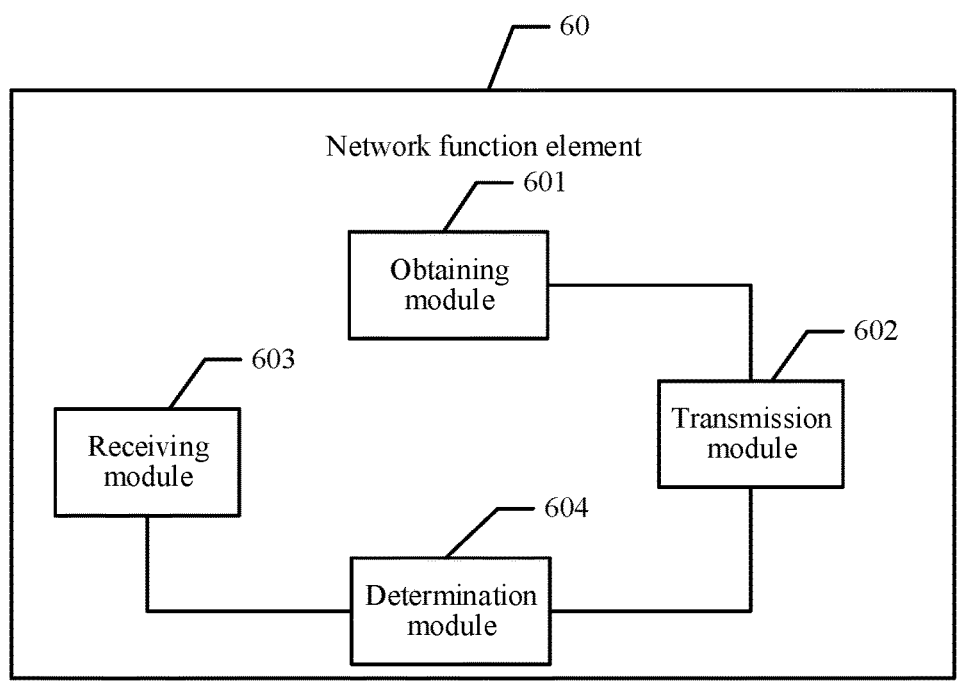
FIG. 10 is a schematic diagram of an embodiment of a network element according to the embodiments of this application.

As shown in FIG. 10, an embodiment of this application provides a network element. The network element may be the first network element in the foregoing embodiments. In an embodiment, a network element 60 may include:

an obtaining module 601, configured to obtain a first drift amplitude value, the first drift amplitude value being a maximum value of a change amplitude of a clock difference between a first clock domain and a second clock domain, the first clock domain being a clock domain of a DN, and the second clock domain being a clock domain of a wireless network in which a first network element is located;

a transmission module 602, configured to transmit the first drift amplitude value obtained by the obtaining module 601 to a second network element, the first drift amplitude value being used by the second network element to transmit a first notification message when detecting that a first maximum drift value is greater than the first drift amplitude value, the first maximum drift value being a difference between a maximum clock difference and a minimum clock difference that are between the first clock domain and the second clock domain in a first time period, the first time period being a time period from a moment at which the second network element receives the first drift amplitude value to a moment at which the first maximum drift value is greater than the first drift amplitude value;

a receiving module 603, configured to receive the first notification message transmitted by the second network element, the first notification message including a first clock difference, the first clock difference being the last clock difference that is acquired by the second network element between the first clock domain and the second clock domain in the first time period, the last clock difference being a clock difference between the first clock domain and the second clock domain when the first maximum drift value is greater than the first drift amplitude value; and a determination module 604, configured to determine first TSCAI according to the first clock difference received by the receiving module 603, the transmission module 602 being further configured to transmit the first TSCAI determined by the determination module to a RAN device, the first TSCAI being used by the RAN device to perform time control on a data stream in the first clock domain.

In the embodiments of this application, one data stream corresponds to one piece of TSCAI. If the second network element reports a clock difference, the first network element needs to update TSCAI corresponding to the data stream according to the reported clock difference, and then transmit the updated TSCAI to the RAN device, so that the RAN device may precisely control the data stream according to the updated TSCAI.

In one embodiment of the present application, the obtaining module 601 is configured to receive the first drift amplitude value transmitted by a PCF element, the first drift amplitude value being transmitted by an AF element to the PCF element or being transmitted by the AF element to the PCF element by using an NEF element.

In one embodiment of the present application, the obtaining module 601 is configured to receive the first drift amplitude value transmitted by a PCF element, the first drift amplitude value being determined by the PCF element according to a second drift amplitude value, the second drift amplitude value being transmitted by an AF element to the PCF element or being transmitted by the AF element to the PCF element by using an NEF element, and the second drift amplitude value being less than the first drift amplitude value.

In one embodiment of the present application, the obtaining module 601 is configured to determine the first drift amplitude value according to configuration information of the first network element.

In one embodiment of the present application, the obtaining module 601 is further configured to obtain a third drift amplitude value, the third drift amplitude value being a maximum value of a change amplitude of a clock difference between a third clock domain and the second clock domain, the third clock domain being a clock domain of a DN that the second network element accesses;

the transmission module 602 is further configured to transmit a PDU session modification request to the RAN device;

the determination module 604 is further configured to determine second TSCAI; and the transmission module 602 is further configured to transmit the second TSCAI to the RAN device, the second TSCAI being used by the RAN device to perform time control on a data stream in the third clock domain.

In one embodiment of the present application, the transmission module 602 is further configured to transmit the third drift amplitude value to the second network element;

the receiving module 603 is further configured to receive a second notification message transmitted by the second network element, the second notification message including a second clock difference, the second notification message being transmitted by the second network element when detecting that a second maximum drift value is greater than the third drift amplitude value, the second maximum drift value being a difference between a maximum clock difference and a minimum clock difference that are between the third clock domain and the second clock domain in a second time period, the second time period being a time period from a moment at which the second network element receives the third drift amplitude value to a moment at which the second maximum drift value is greater than the third drift amplitude value, the second clock difference being the last clock difference that is acquired by the second network element between the third clock domain and the second clock domain in the second time period, the last clock difference being a clock difference between the third clock domain and the second clock domain when the second maximum drift value is greater than the third drift amplitude value; and the determination module 604 is configured to determine the second TSCAI according to the second clock difference.

In one embodiment of the present application, the first network element is an SMF element, and the second network element is a UPF element.

In one embodiment of the present application, the SMF element is an element used when UE establishes a PDU session, the UPF element is an element in the PDU session or an element that is not in the PDU session, and the UPF element is connected to the clock domain of the DN, and is capable of detecting that the first maximum drift value is greater than the first drift amplitude value.

When the UPF element and the SMF element pertain to the same PDU session, the first clock difference is received by using an N4 session establishment response or an N4 session report; or when the UPF element and the SMF element do not pertain to the same PDU session, the first clock difference is received by using an N4 association response report.

Figure 11:
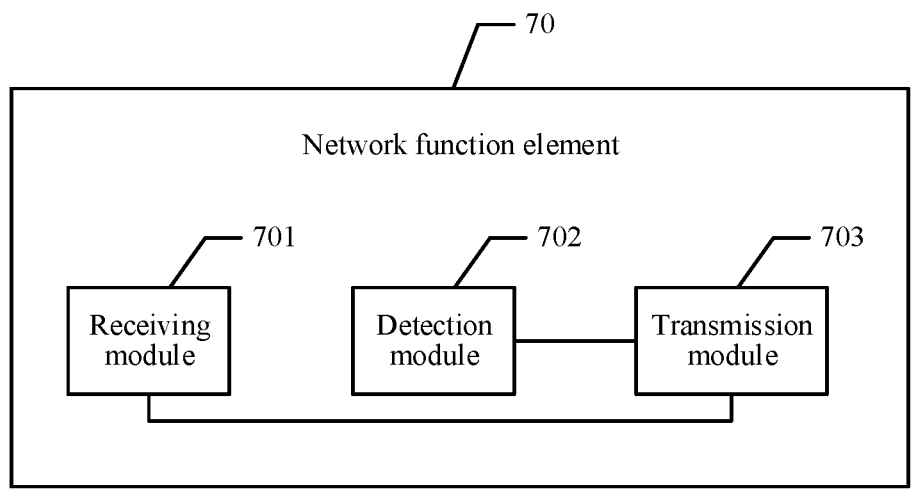
FIG. 11 is a schematic diagram of another embodiment of the network element according to the embodiments of this application.

As shown in FIG. 11, an embodiment of this application provides a network element. The network element may be the second network element in the foregoing embodiments. In an embodiment, a network element 70 may include:

a receiving module 701, configured to receive a first drift amplitude value transmitted by a first network element, the first drift amplitude value being a maximum value of a change amplitude of a clock difference between a first clock domain and a second clock domain, the first clock domain being a clock domain of a DN that the second network element accesses, and the second clock domain being a clock domain of a wireless network in which the first network element is located;

a detection module 702, configured to detect a first maximum drift value, the first maximum drift value being a difference between a maximum clock difference and a minimum clock difference that are between the first clock domain and the second clock domain in a first time period, the first time period being a time period from a moment at which the second network element receives the first drift amplitude value to a moment at which the first maximum drift value is greater than the first drift amplitude value; and a transmission module 703, configured to transmit a first notification message to the first network element when the detection module 702 detects that the first maximum drift value is greater than the first drift amplitude value received by the receiving module 701, the first notification message including a first clock difference, the first clock difference being the last clock difference that is acquired by the second network element between the first clock domain and the second clock domain in the first time period, the last clock difference being a clock difference between the first clock domain and the second clock domain when the first maximum drift value is greater than the first drift amplitude value, the first clock difference being used for determining first TSCAI, and the first TSCAI being used by a RAN device to perform time control on a data stream in the first clock domain.

In one embodiment of the present application, the receiving module is further configured to receive a third drift amplitude value transmitted by the first network element, the third drift amplitude value being a maximum value of a change amplitude of a clock difference between a third clock domain and the second clock domain, the third clock domain being a clock domain of a DN that the second network element accesses.

The transmission module is further configured to transmit a second notification message to the first network element, the second notification message including a second clock difference, the second notification message being transmitted by the second network element when detecting that a second maximum drift value is greater than the third drift amplitude value, the second maximum drift value being a difference between a maximum clock difference and a minimum clock difference that are between the third clock domain and the second clock domain in a second time period, the second time period being a time period from a moment at which the second network element receives the third drift amplitude value to a moment at which the second maximum drift value is greater than the third drift amplitude value, the second clock difference being the last clock difference that is acquired by the second network element between the third clock domain and the second clock domain in the second time period, the last clock difference being a clock difference between the third clock domain and the second clock domain when the second maximum drift value is greater than the third drift amplitude value, the second clock difference being used for determining second TSCAI, and the second TSCAI being used by the RAN device to perform time control on a data stream in the third clock domain.

In one embodiment of the present application, the first network element is an SMF element, and the second network element is a UPF element.

In one embodiment of the present application, the SMF element is an element used when UE establishes a PDU session, the UPF element is an element in the PDU session or an element that is not in the PDU session, and the UPF element is connected to the clock domain of the DN, and is capable of detecting that the first maximum drift value is greater than the first drift amplitude value.

When the UPF element and the SMF element pertain to the same PDU session, the first clock difference is transmitted to the SMF element by using an N4 session establishment response or an N4 session report; or when the UPF element and the SMF element do not pertain to the same PDU session, the first clock difference is transmitted to the SMF element by using an N4 association response report.

Figure 12:
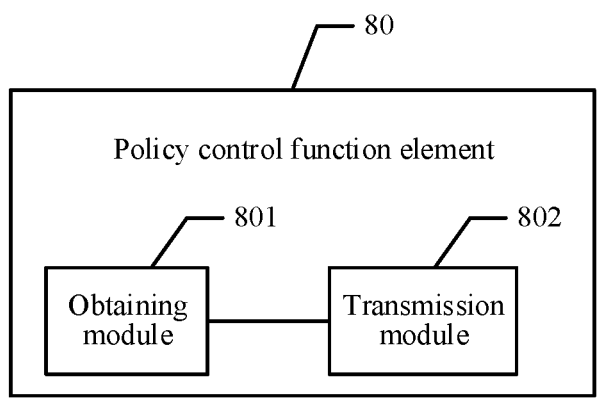
FIG. 12 is a schematic diagram of an embodiment of a PCF element according to the embodiments of this application.

As shown in FIG. 12, an embodiment of this application provides a PCF element 80.

In an embodiment, the PCF element 80 may include:

an obtaining module 801, configured to obtain a first drift amplitude value, the first drift amplitude value being a maximum value of a change amplitude of a clock difference between a first clock domain and a second clock domain, the first clock domain being a clock domain of a DN, and the second clock domain being a clock domain of a wireless network in which a first network element is located; and a transmission module 802, configured to transmit the first drift amplitude value obtained by the obtaining module 801 to the first network element, the first drift amplitude value being used by a second network element to transmit a first notification message to the first network element when detecting that a first maximum drift value is greater than the first drift amplitude value, the first maximum drift value being a difference between a maximum clock difference and a minimum clock difference that are between the first clock domain and the second clock domain in a first time period, the first time period being a time period from a moment at which the second network element receives the first drift amplitude value to a moment at which the first maximum drift value is greater than the first drift amplitude value, the first notification message including a first clock difference, the first clock difference being the last clock difference that is acquired by the second network element between the first clock domain and the second clock domain in the first time period, the last clock difference being a clock difference between the first clock domain and the second clock domain when the first maximum drift value is greater than the first drift amplitude value, the first clock difference being used for determining first TSCAI, and the first TSCAI being used by a RAN device to perform time control on a data stream in the first clock domain.

In one embodiment of the present application, the obtaining module 801 is configured to receive the first drift amplitude value transmitted by an AF element, or the first drift amplitude value transmitted by the AF element by using an NEF element.

In one embodiment of the present application, the obtaining module 801 is configured to:

receive a second drift amplitude value transmitted by an AF element, or a second drift amplitude value transmitted by the AF element by using an NEF element; and determine the first drift amplitude value according to the second drift amplitude value, the second drift amplitude value being less than the first drift amplitude value.

In one embodiment of the present application, the obtaining module 801 is configured to determine the first drift amplitude value according to configuration information of the PCF element.

In one embodiment of the present application, the first network element is an SMF element, and the second network element is a UPF element.

In one embodiment of the present application, the SMF element is an element used when UE establishes a PDU session, the UPF element is an element in the PDU session or an element that is not in the PDU session, and the UPF element is connected to the clock domain of the DN, and is capable of detecting that the first maximum drift value is greater than the first drift amplitude value.

It may be understood that, to implement the foregoing functions, the foregoing network element includes a corresponding hardware structure and/or software module for performing the functions. A person skilled in the art is easily to realize that with reference to the functions described in the embodiments disclosed in this specification, this application can be implemented in a form of hardware or a form of a combination of hardware and computer software. Whether a function is performed by hardware or hardware driven by computer software depends on particular applications and design constraints of the technical solutions. A person skilled in the art may use different methods to implement the described functions for each particular application, but such implementation is not to be considered beyond the scope of this application.

From a perspective of a physical apparatus, the network element may be implemented by a physical apparatus, or may be jointly implemented by a plurality of physical apparatuses, or may be a logical function unit in a physical apparatus. This is not specifically limited in the embodiments of this application.

Figure 13:
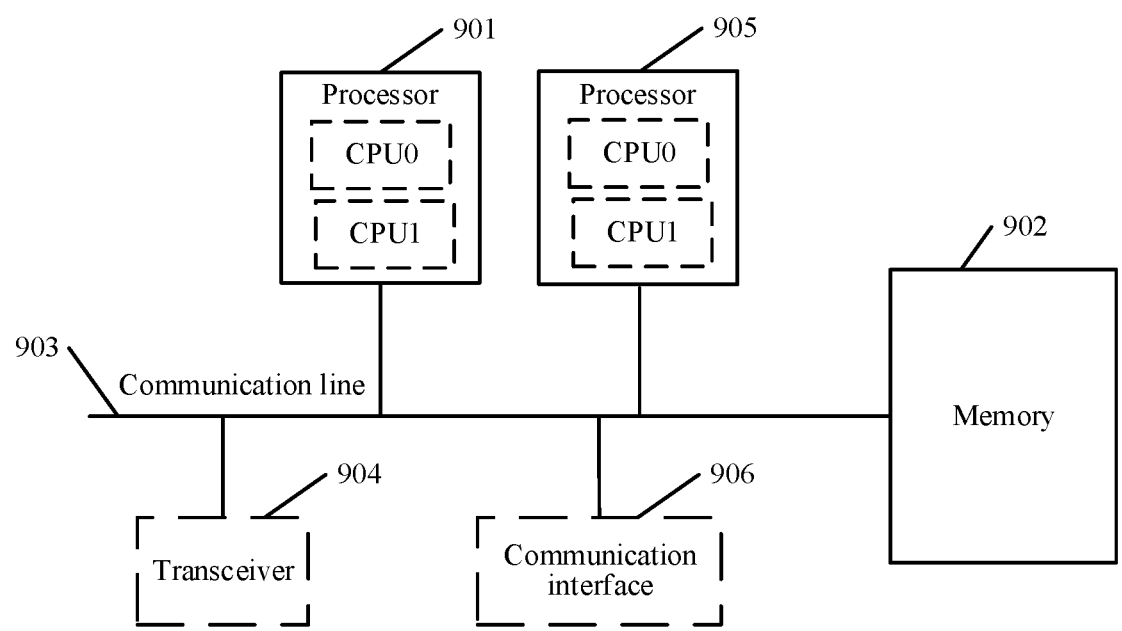
FIG. 13 is a schematic diagram of an embodiment of a network device according to the embodiments of this application.

For example, the network element may be implemented by a network device in FIG. 13. FIG. 13 is a schematic diagram of a hardware structure of a network device according to an embodiment of this application. The network device includes at least one processor 901, a memory 902, and a communication line 903. The network device may further include at least one of a transceiver 904 and a communication interface 906.

The processor 901 may be a general central processing unit (CPU), a microprocessor, an application-specific integrated circuit (ASIC), or one or more integrated circuits configured to control execution of a program in the solutions of this application.

The communication line 903 may include a channel, to transmit information between the foregoing components.

The transceiver 904 is an apparatus using any type of transceiver, and is configured to communicate with another device or a communication network, such as the Ethernet, a RAN, or a wireless local area network (WLAN). The transceiver 904 may be alternatively a transceiver circuit. When the network device is a network function entity, the transceiver may be included.

The network device may also include the communication interface 906.

The memory 902 may be a read-only memory (ROM) or another type of static storage device capable of storing static information and instructions, a random access memory (RAM) or another type of dynamic storage device capable of storing information and instructions, or may be an electrically erasable programmable ROM (EEPROM), a compact disc ROM (CD-ROM), or other compact disc storage or optical disc storage (including a compressed optical disc, a laser disc, an optical disc, a digital universal optical disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and connect to the processor 901 by using the communication line 903. The memory 902 may be alternatively integrated in the processor 901.

The memory 902 is configured to store computer-executable instructions for executing the solutions of this application, and the processor 901 controls execution. The processor 901 is configured to execute the computer-executable instructions stored in the memory 902 to implement the method for processing clock drift provided in the method embodiments of this application.

In one embodiment of the present application, the computer-executable instructions in the embodiments of this application may be alternatively referred to as application program code. This is not specifically limited in the embodiments of this application.

During specific implementation, in an embodiment, the processor 901 may include one or more CPUs, for example, a CPU 0 and a CPU 1 in FIG. 13.

During specific implementation, in an embodiment, the network device may include a plurality of processors, for example, a processor 901 and a processor 905 in FIG. 13. Each of these processors may be a single-CPU processor, or may be a multi-CPU processor. The processor herein may be one or more devices or circuits, and/or a processing core configured to process data (for example, computer-executable instructions).

From a perspective of a function unit, in this application, the network device may be divided into function units according to the foregoing method embodiments. For example, one function unit may correspond to one function, or two or more functions may be integrated in one function unit. The integrated function unit may be implemented in a form of hardware, or may be implemented in a form of a software function unit, or a combination thereof.

Some functions of the receiving module, the transmission module, and the obtaining module may be implemented by using the transceiver 904, and some functions of the determination module, the detection module, and the obtaining module may be implemented by using the processor 901 or the processor 905.

The term module, and other similar terms such as subunit, unit, submodule, etc., in this disclosure may refer to a software unit, a hardware unit, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each unit can be part of an overall module that includes the functionalities of the module.

All or some of the foregoing embodiments may be implemented by using software, hardware, firmware, or any combination thereof. When software is used for implementation, implementation may be entirely or partially performed in the form of a computer program product.

The computer program product includes one or more computer instructions. When the computer instructions are loaded and executed on a computer, all or some of the processes or functions according to the embodiments of this application are produced. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, a computer, server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk (SSD)), or the like.

A person of ordinary skill in the art may understand that all or some of the steps of the methods in the embodiments may be implemented by a program instructing relevant hardware. The program may be stored in a computer-readable storage medium. The storage medium may include: a ROM, a RAM, a magnetic disk, or an optical disc.

The method for processing clock drift, the element, the device, and the storage medium provided in the embodiments of this application are described in detail above. The principle and implementations of this application are described herein by using specific examples. The descriptions of the foregoing embodiments are merely used for helping understand the method and core ideas of this application. Meanwhile, a person of ordinary skill in the art may make modifications to the specific implementations and application scopes according to the ideas of this application. In conclusion, the content of this specification is not to be construed as a limitation to this application.

What is claimed is:

1. A method for processing clock drift implemented by network elements, comprising:
receiving, by a first network element, a first notification message transmitted by a second network element, the first notification message comprising a first clock difference, the first clock difference being a clock difference between a first clock domain and a second clock domain acquired by the second network element in a first time period, wherein: transmission of the first notification message by the second network element is triggered in response to a clock drift being greater than a drift amplitude value, the clock drift is a difference between a first value and a second value of the first clock difference in the first time period, the first clock domain is a clock domain of a data network (DN), the second clock domain is a clock domain of a wireless network, and the drift amplitude value is a maximum value of a change amplitude of a clock difference between the first clock domain and the second clock domain;
determining, by the first network element, first time sensitive communication assistance information (TSCAI) according to the first clock difference; and
transmitting, by the first network element, the first TSCAI to a radio access network (RAN) device, the first TSCAI being used by the RAN device to perform time control on a data stream in the first clock domain, the time control comprising assignments of radio resources and scheduling of data based on the first TSCAI.

2. The method according to claim 1, wherein the first clock domain is a Time Sensitive Network (TSN) clock domain, and the second clock domain is a 5G network clock domain.

3. The method according to claim 1, wherein the first network element is a session management function (SMF) element, and the second network element is a user plane function (UPF) element.

4. The method according to claim 3, wherein the SMF element is a network element used when a user equipment (UE) establishes a packet data unit (PDU) session, and the UPF element is a network element that is not in the PDU session.

5. The method according to claim 4, wherein:
when the UPF element and the SMF element pertain to the same PDU session, the first clock difference is received through an N4 session establishment response or an N4 session report; and
when the UPF element and the SMF element do not pertain to the same PDU session, the first clock difference is received through an N4 association response report.

6. A method for processing clock drift implemented by network elements, comprising:
transmitting, by a second network element, a first notification message to a first network element, the first notification message comprising a first clock difference, the first clock difference being a clock difference between a first clock domain and a second clock domain acquired by the second network element in a first time period, wherein: transmission of the first notification message by the second network element is triggered in response to a clock drift being greater than a drift amplitude value, the clock drift is a difference between a first value and a second value of the first clock difference in the first time period, the first clock domain is a clock domain of a data network (DN), the second clock domain is a clock domain of a wireless network, the drift amplitude value is a maximum value of a change amplitude of a clock difference between the first clock domain and the second clock domain, the first clock difference is used for determining first time sensitive communication assistance information (TS- CAI) by the first network element, and the first TSCAI is used by a radio access network (RAN) device to perform time control on a data stream in the first clock domain.

7. The method according to claim 6, wherein the first clock domain is a Time Sensitive Network (TSN) clock domain, and the second clock domain is a 5G network clock domain.

8. The method according to claim 6, wherein the first network element is a session management function (SMF) element, and the second network element is a user plane function (UPF) element.

9. The method according to claim 8, wherein the SMF element is an element used when user equipment (UE) establishes a packet data unit (PDU) session, the UPF element is an element that is not in the PDU session.

10. The method according to claim 9, wherein:
when the UPF element and the SMF element pertain to the same PDU session, the first clock difference is received through an N4 session establishment response or an N4 session report; and
when the UPF element and the SMF element do not pertain to the same PDU session, the first clock difference is transmitted to the SMF element through an N4 association response report.

11. A first network element, comprising: a processor, and a memory, the memory being configured to store computer-executable instructions, and the processor being configured to execute the computer-executable instructions to perform:
receiving a first notification message transmitted by a second network element, the first notification message comprising a first clock difference, the first clock difference being a clock difference between a first clock domain and a second clock domain acquired by the second network element in a first time period, wherein: transmission of the first notification message by the second network element is triggered in response to a clock drift being greater than a drift amplitude value, the clock drift is a difference between a first value and a second value of the first clock difference in the first time period, the first clock domain is a clock domain of a data network (DN), the second clock domain is a clock domain of a wireless network, and the drift amplitude value is a maximum value of a change amplitude of a clock difference between the first clock domain and the second clock domain;
determining first time sensitive communication assistance information (TSCAI) according to the first clock difference; and
transmitting the first TSCAI to a radio access network (RAN) device, the first TSCAI being used by the RAN device to perform time control on a data stream in the first clock domain.

12. The first network element according to claim 11, wherein the first clock domain is a Time Sensitive Network (TSN) clock domain, and the second clock domain is a 5G network clock domain.

13. The first network element according to claim 11, wherein the first network element is a session management function (SMF) element, and the second network element is a user plane function (UPF) element.

14. The first network element according to claim 13, wherein the SMF element is a network element used when a user equipment (UE) establishes a packet data unit (PDU) session, and the UPF element is a network element that is not in the PDU session.

15. The first network element according to claim 14, wherein:
when the UPF element and the SMF element pertain to the same PDU session, the first clock difference is received through an N4 session establishment response or an N4 session report; and
when the UPF element and the SMF element do not pertain to the same PDU session, the first clock difference is received through an N4 association response report.

16. A second network element, comprising: a processor, and a memory, the memory being configured to store computer-executable instructions, and the processor being configured to execute the computer-executable instructions to perform:
transmitting, by a second network element, a first notification message to a first network element, the first notification message comprising a first clock difference, the first clock difference being a clock difference between a first clock domain and a second clock domain acquired by the second network element in a first time period, wherein: transmission of the first notification message by the second network element is triggered in response to a clock drift being greater than a drift amplitude value, the clock drift is a difference between a first value and a second value of the first clock difference in the first time period, the first clock domain is a clock domain of a data network (DN), the second clock domain is a clock domain of a wireless network, the drift amplitude value is a maximum value of a change amplitude of a clock difference between the first clock domain and the second clock domain, the first clock difference is used for determining first time sensitive communication assistance information (TSCAI) by the first network element, and the first TSCAI is used by a radio access network (RAN) device to perform time control on a data stream in the first clock domain.

17. The second network element according to claim 16, wherein the first clock domain is a Time Sensitive Network (TSN) clock domain, and the second clock domain is a 5G network clock domain.

18. The second network element according to claim 16, wherein the first network element is a session management function (SMF) element, and the second network element is a user plane function (UPF) element.

19. The second network element according to claim 18, wherein the SMF element is an element used when user equipment (UE) establishes a packet data unit (PDU) session, the UPF element is an element that is not in the PDU session.

20. The second network element according to claim 19, wherein:
when the UPF element and the SMF element pertain to the same PDU session, the first clock difference is received through an N4 session establishment response or an N4 session report; and
when the UPF element and the SMF element do not pertain to the same PDU session, the first clock difference is transmitted to the SMF element through an N4 association response report.

* * * * *